United States Patent
Carter et al.

(10) Patent No.: US 7,590,232 B2
(45) Date of Patent: Sep. 15, 2009

(54) SYSTEM AND METHOD FOR TRACKING INDIVIDUALS

(76) Inventors: John A. Carter, 4520 Sandy Water La., Plano, TX (US) 75024; Ronald D. DeBerry, 1607 Wood Ridge Ct., Corinth, TX (US) 76210; Kurt Schuder, 2135 Kessler Ct., Dallas, TX (US) 75208

( * ) Notice: Subject to any disclaimer, the term of this patent is extended or adjusted under 35 U.S.C. 154(b) by 772 days.

(21) Appl. No.: 11/091,129

(22) Filed: Mar. 28, 2005

(65) Prior Publication Data

US 2006/0020459 A1 Jan. 26, 2006

Related U.S. Application Data

(60) Provisional application No. 60/590,177, filed on Jul. 21, 2004.

(51) Int. Cl.
*H04M 3/58* (2006.01)
(52) U.S. Cl. .............. 379/209.01; 379/88.02; 379/210.01; 379/265.01; 701/301; 705/26; 709/248; 710/6
(58) Field of Classification Search .......... 379/88.02, 379/114.2, 209.1, 210.01, 265.01; 455/412.1; 704/275; 701/301; 705/26; 709/248; 710/6
See application file for complete search history.

(56) References Cited

U.S. PATENT DOCUMENTS

| | | | |
|---|---|---|---|
| 4,843,377 A | 6/1989 | Fuller et al. | |
| 5,365,574 A | 11/1994 | Hunt et al. | |
| 5,646,839 A | 7/1997 | Katz | |
| 6,035,031 A * | 3/2000 | Silverman | 379/209.01 |
| 6,101,242 A | 8/2000 | McAllister et al. | |
| 6,205,204 B1 * | 3/2001 | Morganstein et al. | 379/67.1 |
| 6,223,156 B1 | 4/2001 | Goldberg et al. | |
| 6,246,988 B1 | 6/2001 | Schier | |
| 6,307,928 B1 * | 10/2001 | Yamasaki | 379/210.01 |
| 6,401,066 B1 | 6/2002 | McIntosh | |
| 6,408,062 B1 * | 6/2002 | Cave | 379/210.01 |
| 6,483,896 B1 | 11/2002 | Goldberg et al. | |
| 6,496,571 B1 | 12/2002 | Wilson | |
| 6,529,870 B1 | 3/2003 | Mikkilineni | |
| 6,658,389 B1 * | 12/2003 | Alpdemir | 704/275 |
| 6,681,205 B1 | 1/2004 | San Martin et al. | |
| 7,242,760 B2 * | 7/2007 | Shires | 379/265.01 |
| 2003/0229492 A1 | 12/2003 | Nolan | |
| 2004/0019426 A1 * | 1/2004 | Knoop et al. | 701/301 |
| 2004/0029567 A1 * | 2/2004 | Timmins et al. | 455/412.1 |
| 2004/0039846 A1 * | 2/2004 | Goss et al. | 709/248 |
| 2004/0240646 A1 * | 12/2004 | O'Donnell | 379/114.2 |
| 2005/0154649 A1 * | 7/2005 | Jalili | 705/26 |
| 2007/0083678 A1 * | 4/2007 | Bateman et al. | 710/6 |

* cited by examiner

*Primary Examiner*—Gerald Gauthier
(74) *Attorney, Agent, or Firm*—Schultz & Associates, P.C.

(57) ABSTRACT

A client identity verification system and method which includes receiving a spoken voice sample from a client. Identifying the match of the client, verifying client information, changing parameters in a conditional database and communicating alerts based on the results. The method also includes matching the received spoken voice sample against a stored voiceprint and voiceprint template of random phrases. The method then also includes verifying the phone number of the client.

63 Claims, 14 Drawing Sheets

SYSTEM AND METHOD FOR TRACKING INDIVIDUALS

CROSS-REFERENCE TO RELATED APPLICATION

This application claims priority to U.S. Provisional Application Ser. No. 60/590,177, entitled "Solutions for Immigration Tracking and Intelligence", by Carter, et al., filed Jul. 21, 2004.

BACKGROUND OF THE INVENTION

The Bureau of Immigration and Customs Enforcement (ICE) under the Directorate of Border and Transportation Security (BTS) within the Department of Homeland Security (DHS) has been charged with tracking the whereabouts of visitors to the United States. The Bureau tracks visitors such as foreign exchange students, foreign business travelers, and others that have been issued a limited visa. A system to provide information necessary to positively identify and locate those individuals is required.

The Patriot Act of 2001 requires monitoring of the vast number of foreign students and increased the need for information sharing for critical infrastructure protection. Therefore, a need further exists to protect the borders of the United States form unauthorized immigration.

One method of verifying individuals involves the use of biometric technology. Biometric technology employs are automated methods for identifying or verifying the identity of an individual based on physiological or behavioral characteristics. These characteristics include fingerprints, vocal recognition, facial characteristics and eye recognition. Normally, biometric technology is used in situations requiring highly secure personal authentication.

Prior art biometric technology is capable of verifying a client's identity by using previously recording voice samples. The voice samples may include words or phrases can include an individual's name, location, or a random set of numbers. Known biometric systems compare the individual's spoken voice sample to that of the recorded voice samples to verify the identity of the individual. However, prior art systems can only verify the identity of the individual.

Prior art systems allow a computer system interfaced with the public telephone network to detect from the incoming telephone call automatic number identification (ANI) data. ANI data identifies the phone number of the calling telephone and a computer system in conjunction with the ANI can be used to generate reports of the incoming telephone calls.

U.S. Pat. No. 5,646,839 to Katz discusses a computer system that detects ANI data from incoming telephone calls. The system of Katz accepts personal identification codes from the caller and generates reports of the location of the calling telephone and the person making the telephone call.

U.S. Pat. No. 6,223,156 B1 to Goldberg et al. disclosed a system that increases the accuracy of recognizing a set of spoken numbers and letters. The system of Goldberg reads a telephone number received with the telephone call and location information associated with the caller. A database identifies callers having a particular zip code or area code. A processor determines if spoken numbers and letters match a retrieved record.

U.S. Patent Pub. No. U.S. 2003/0229492 A1 to Nolan discloses a method of identity verification which employs a database containing registered biometric samples of users.

SUMMARY OF THE INVENTION

It is an object of the present invention to provide a method and system for verifying a client's identity. Another object of the invention is to provide a method and system for verification and location tracking of a client.

It is a further aspect of the present invention to provide a method and system to trigger an alert based on the client's location changes or by receiving a call from a client in a restricted location.

It is a further aspect of the present invention to provide a method for verifying a client's identity by receiving a spoken voice sample from a client; determining a calling phone number of the client; matching the spoken voice sample against a stored voiceprint template of random phrases; and verifying the phone number of the client.

It is a further aspect of the present invention to provide a method for receiving a spoken voice sample from a client; determining a phone number of the client; comparing the spoken voice sample against a stored voiceprint and a voiceprint template with a voice verification process; recording the phone number and verification in a client record database.

It is a further aspect of the present invention to provide a method for location tracking by receiving a phone call from a client, determining the phone number and location of that call, storing the location in a client record database, and examining one or more client records to identify a conditional relationship.

It is a further aspect of the present invention to provide a database with conditionally related parameters subject to change regarding perceived risk factors.

It is a further aspect of this invention to provide a method for searching a database for information related to a relationship between clients.

It is a further aspect of this invention to provide a method and system for identifying geographic anomalies between client locations determined by history tracking.

DETAILED DESCRIPTION

The present invention is described in this specification in terms of methods and systems execution on a computer system. The invention also may be embodied in a computer program product, such as a diskette or other recording medium, for use with any suitable data processing system. Alternative embodiments may be implemented as firmware or hardware.

In the specification, the word "client" refers to an individual being tracked. In the specification, a "case worker" is an individual who monitors the operation of the system and the location of the client. A "callback requirement" refers to a notification of when and how a client is to contact the system and/or a case worker.

Figure 1:
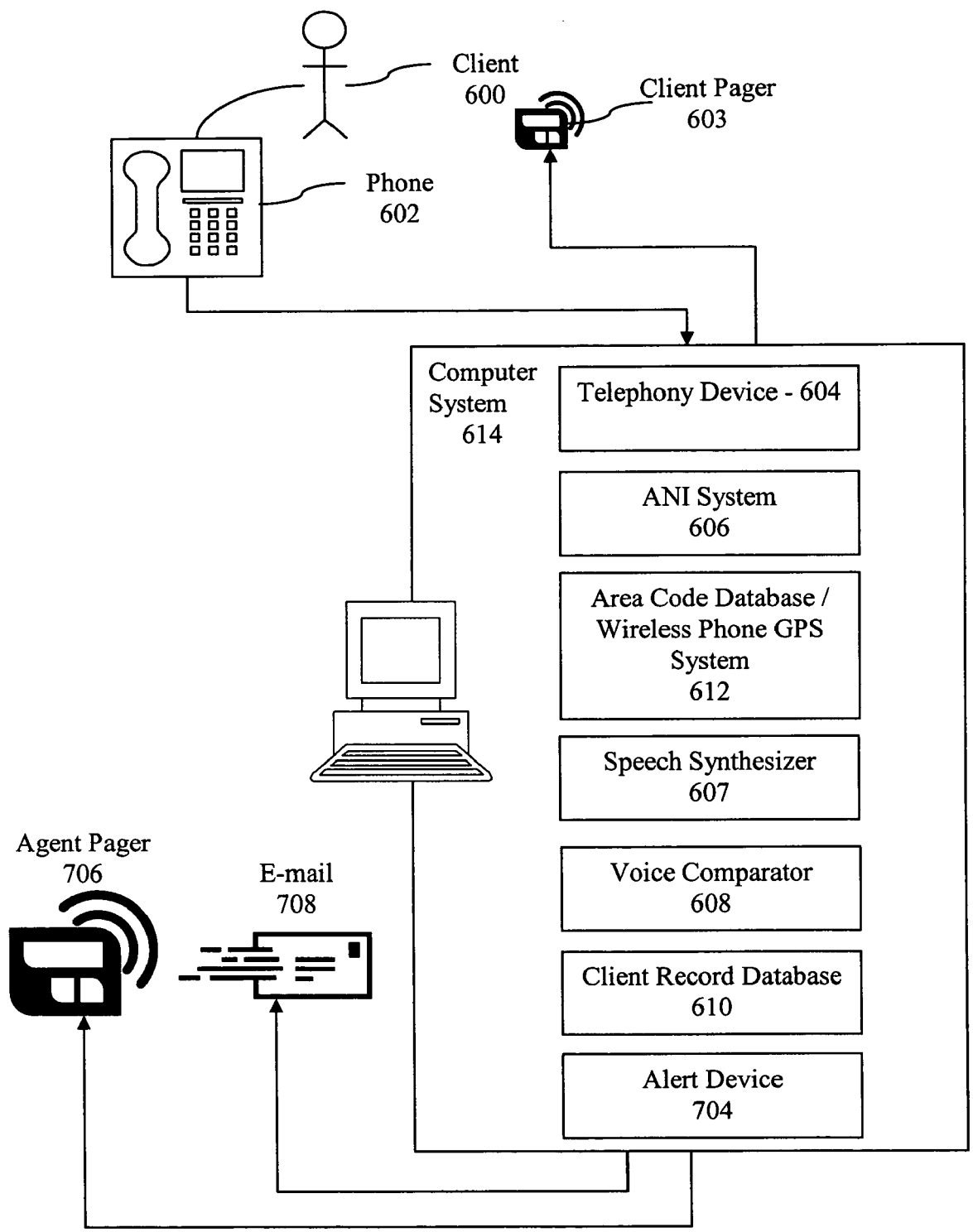
FIG. 1 illustrates an exemplary computer system for carrying out the invention.

Turning to FIG. 1, illustrated is an exemplary computer system 614 for verifying client identity in accordance with the present invention. In the preferred embodiment, the system includes a telephony device 604, an Automatic Number Identification (ANI) system 606, a voice comparator 608, client record database 610 and an area code database or wireless phone GPS system 612. Computer system 614 also includes a speech synthesizer 607.

In the preferred embodiment of the present invention, computer system 614 is a personal computer running Microsoft Windows 2000 based operating system. However, any computer system capable of allowing multiple accesses to a database of client records and supporting software capable of comparing voice samples, accessing peripheral devices and executing manipulations of a conditional database will suffice.

Client record database 610 is a conditionally related database whose records may be searched and changed iteratively and recursively according to a set of rules. The client record database contains many fields of information organized into client records related to a particular client. Client record database 610 may include multiple phone numbers for the client. Client record database 610 may include information about the client such as past and present residences or geographic locations and travel patterns between the locations. The client's past and present area code and zip code may be stored, as well as personal identification data, official records (such as driving records, arrest records, immigration, and passport data), photographic data, finger print data, voice prints, retina scan data and medical histories. Other information such as the clients' relationship to other clients may be stored in the client record database.

In a preferred embodiment, the client record table includes the name of the client, an associated PIN number, the last known geographic location of the client, a phone number and associated "restrictions". The "last" location field may contain multiple numbers in a first in last out arrangement where a certain number of most recent callback locations are stored in order. The "restrictions" field provides a list of authorized geographic areas in which the client is allowed. Alternatively, the field may list a list of geographic areas in which the client is not allowed. Examples of "restrictions" are a specific calling number, a specific area code, a state, city, county, country, a designated set of GPS latitude and longitude coordinates indicating an area (or altitude), or any combination of the foregoing.

The client record database may also include client call origination location and a callback schedule and/or frequency.

A client's risk level, a terror level setting and a callback history are also retained by the database.

The information in client record database 610 may be updated manually. The client record may also be updated by the computer system automatically by an incoming client call. An internet interface may also be used to update the client record database.

Client record database 610 is a conditional database. A conditional database in the preferred embodiment is a database which can search for any particular field associated with any record and/or change them based on a set of instructions or rules. In such a conditional database for instance, if a single parameter is changed, it may affect any number of other parameters. Actions within the conditional database are recursive. Recursive actions mean that any one change in a parameter in a conditional database may affect other parameters which, in turn, affect still further parameters within the conditional database.

One such conditional parameter in the preferred embodiment is a field that indicates a client "risk level". The client "risk level" can be automatically calculated or manually input based on external factors such as country of national origin, criminal history, foreign military and government service. Conditions that may potentially alter the client risk level may also be included in the database, such as geographic movement distance, geographic movement frequency, verification failure and callback failure.

Another such conditional parameter is a field that indicates "terror level". The "terror level" can be automatically calculated or manually input based on external factors such as the United States Homeland Security Advisory threat level. Conditions that may alter the "terror level" may also be included in the database, such as a geographic grouping of frequency of threats, bombing activities, or other political actions characterized by the system. Additionally, since activity within the conditional database is recursive, any grouping of parameters can automatically trigger an increase or decrease in the "threat level".

The client record database may be maintained on a single computer or distributed. For example, the client record database may be a single database file or dispensed into separate related databases. For example, client record database 610 may contain a pointer referencing a general data file stored in a different location. A reason for referencing a separate general data file is to reduce the size of the client record table for more efficient access. In the preferred embodiment, the client record database is stored in a relational database with fields based on client name.

Maintenance and supervision of the searching and conditional relationships of the database are conducted by a host program that that coordinates the functions of the invention. In the preferred embodiment, the client record database is written in Microsoft Excel. Of course, other relational database platforms may be used with equal success.

The client record database can be made readily available to authorized investigators. Since a client may occasionally call in from a friend or relative's phone, investigators can use the number identified as a means of completing relationship charts or to identify an additional means of contact in the even the client cannot be reached directly.

The system employs a phone 602 accessible to client 600 and connected to computer system 614. Phone 602 includes any telephone device, wireless device, computer device capable of transmitting and receiving voice transmissions at any location. Additionally, there can be any number of telephones used. The system further employs a client pager 603 connected to computer system 614 and available to client 600. Client pager 603 is carried by client 600.

Telephony device 604 in computer system 614 is configured to receive calls from phone 602. Telephony device 604 is a peripheral device capable of monitoring an incoming phone call, intercepting a call, analyzing it and transmitting voice and data signals. In the preferred embodiment of the invention the telephony device is a telephone card plugged into the motherboard of computer system 614. In an alternate embodiment, telephone device 604 can be a modem attached to a computer, or software capable of receiving voice over IP.

ANI system 606 is a service provided by a telephone service provider which determines and delivers the phone number of phone 602 to the computer system. Examples of these services include the Automatic Number Identification (ANI) and Client-ID. Both systems disclose a calling party's phone number.

Caller-ID discloses the calling party's phone number upon receiving a call. However the Caller-ID service may be blocked or manipulated. The ANI service provides the receiver of a telephone call with the number of the caller phone number. Unlike Caller-ID, the ANI service is used in the billing information of the called party and cannot be blocked. The service is often provided by sending the digital tone multi frequency (DTMF) tones along with the call, which can be decoded and interpreted by computer system 614.

A client's location may be determined by identifying the area code of the phone number provided by the ANI system if the phone is a landline and relating it by reference to a lookup table in which is stored a corresponding geographic area. A wireless telephone's location may be calculated by using the GPS service available in wireless phones which contain a small global positioning system receiver. Alternatively, a wireless phone's location may be calculated by using the distance between several cellular towers in contact with the cellular phone or the nearest wireless trunk tower.

Voice comparator 608 is a software program resident on computer system 614 configured to compare a spoken voice sample of phrases received from phone 602 with a stored voiceprint and voiceprint template of phrases. A voiceprint is a stored combination of frequencies produced by the client when speaking certain phrases. A voiceprint template is a series of words, letters and/or numbers stored in the client record database. Voice recognition in the preferred embodiment verifies the voiceprint frequencies of the client. Voice recognition also comprises recognizing a series of words spoken by the client.

Speech synthesizer 607 is a peripheral device capable of manipulating digital data to generate human sounding speech and transmitting it to telephony device 604 for transmission to telephone 602. In the preferred embodiment, speech synthesizer 607 is the Nuance Vocalizer™ 4.0, available from Nuance, of Menlo Park, Calif., USA.

An alert device 704 is provided. The alert device is a peripheral device which is used by the computer system to make a contact with an agent pager 706 or e-mail 708. In an alternate embodiment, the alert device may enable an automated phone contact, automated display or by other reliable forms of communication.

Figure 2:
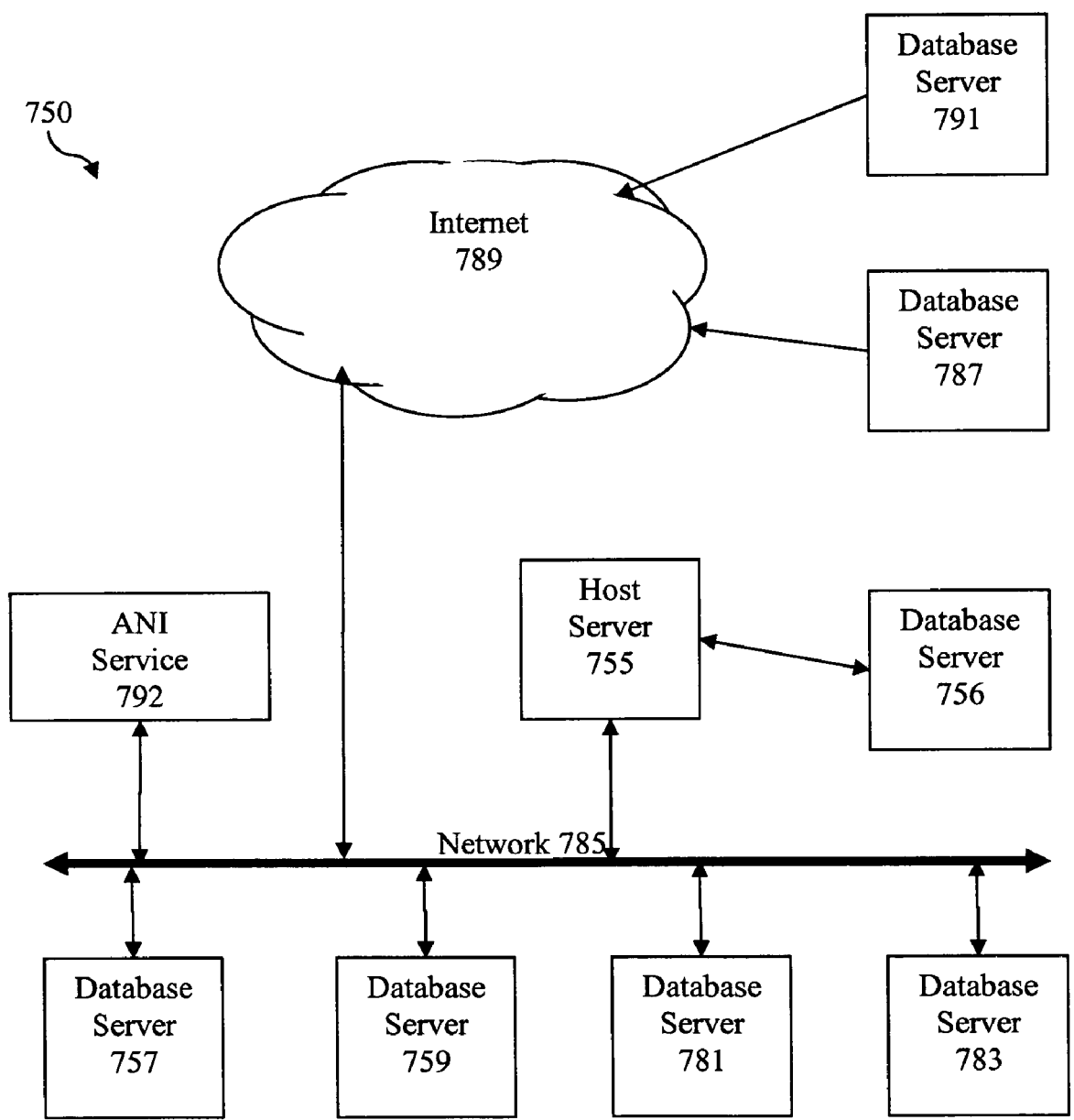
FIG. 2 illustrates an exemplary computer system for carrying out the invention on a computer network.

Referring now to FIG. 2, the invention may be carried out in a distributed format. A distributed format includes a computer network system comprised of a host server 755 and database servers 757, 759, 781 and 783 connected, as known in the art, by Ethernet 785 and communicating through TCP/IP protocol. Network 750 further includes an Ethernet connection to the internet at 789, which is in turn connected to distant database servers 787 and 791. In the preferred embodiment, ANI service 792 is also connected to the network. Of course, the number of database servers is arbitrary.

In operation, host server 755 maintains and runs a host program which will be further described. The host program accesses various databases of information including information located on database servers 756, 757, 759, 781 and 783 via Ethernet connection 785. The host program is also capable of communicating with and receiving data from distant database servers 791 and 797 through internet 789. Host server 755 is capable of running several instances of the host program and generating queries to each database server alone or concurrently.

In the preferred embodiment, the host program which is resident on either computer system 614 or host server 755, is implemented in object oriented language such as C++. C++ is readily available and can be compiled on a number of different platforms. The host program carries out one or more of the methods described below utilizing objects and methods which should be obvious to those skilled in the art.

Figure 3:
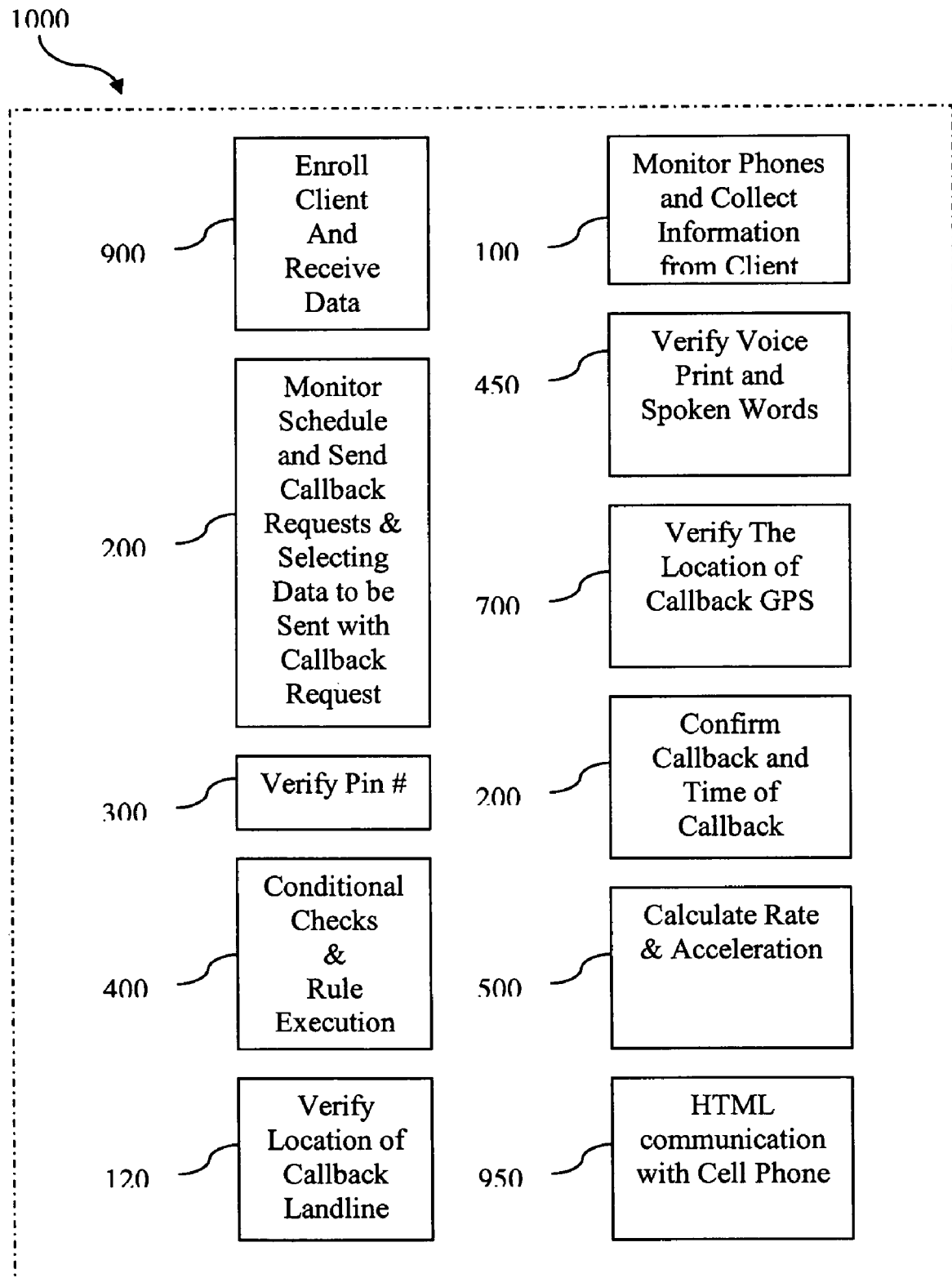
FIG. 3 illustrates an exemplary set of objects for carrying out the invention.

Referring to FIG. 3, host program 1000 contains objects which communicate with each other as required to accomplish the activities and calculations necessary for operation of the apparatus. Of course, other objects and methods which carry out the required steps fall within the scope of the invention. Host program 1000 includes a module to enroll clients and receive data at 900. The host program includes a module which monitors telephones and collect incoming information from a client via those telephones at 100. At 450, a module is included which verifies voice prints and spoken words. A module is included at 700 which verifies the location of a callback from a GPS enabled client. At 120, a module is included which verifies the location of a landline enabled client. Module 200 of the program confirms a callback from a client and the time the callback was made. At 500, a module calculates a rate and acceleration of changes in location of the client.

At 950, a module is included which enables HTML communication with a cell phone. Module 300 provides a method to verify data from a client including a PIN number. Module 200 includes an object and method for monitoring a callback schedule and sending callback requests and selecting data to be sent with a callback request. Module 400 provides an object and methods for scanning the client record database and altering data within it based on conditional checks.

Figure 4:
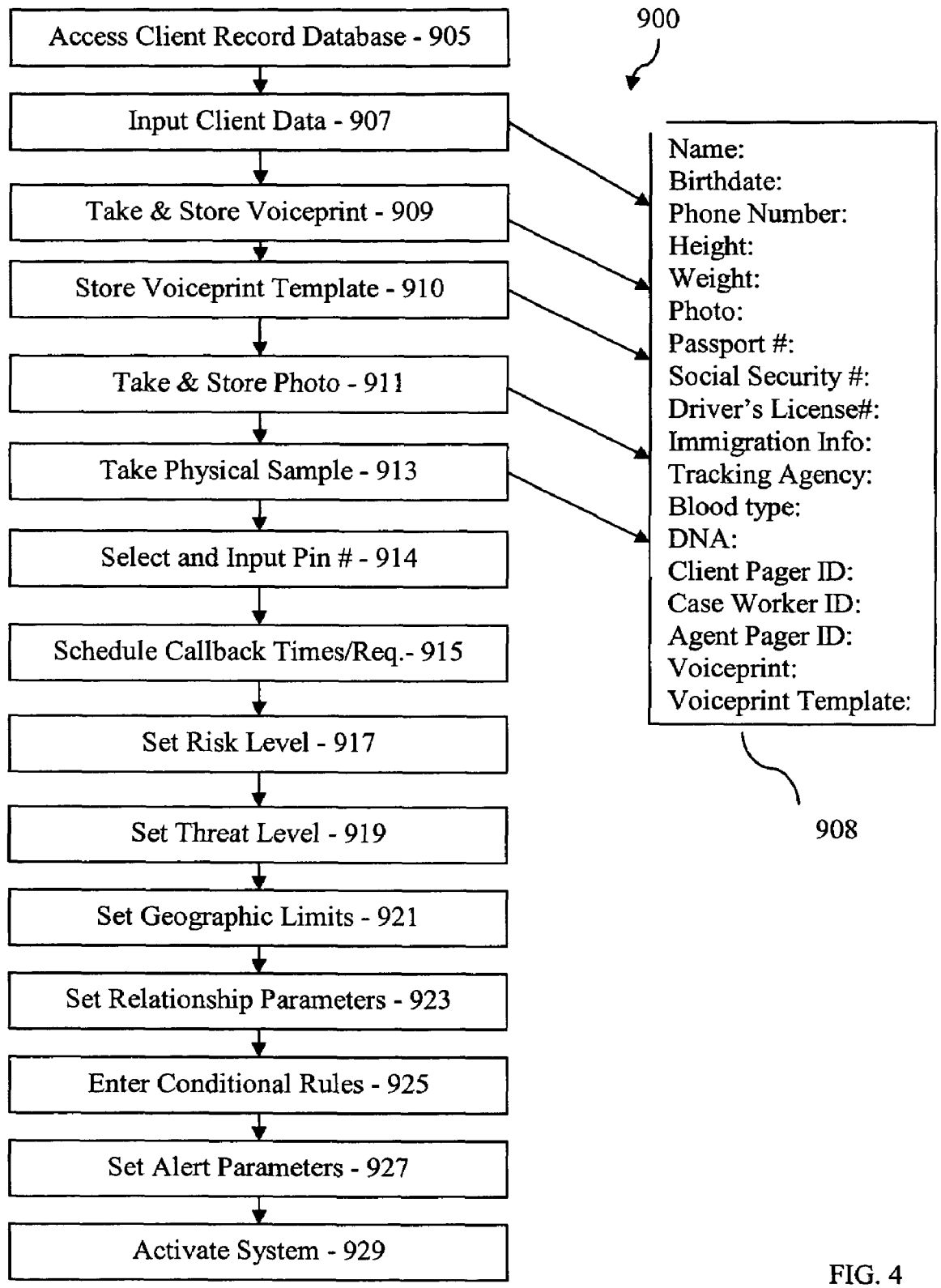
FIG. 4 illustrates an exemplary method of enrolling a client in the system.

Referring to FIG. 4A, method of enrolling a client and receiving data 900 is depicted. Method 900 includes accessing the client record database at step 905 and inputting client data at 907. Client data, shown as 908, includes the name of the client, the phone number, physical information such as date of birth, height, weight and appearance (recorded in a textual description). The client data also includes unique numbers assigned by governmental entities, such as Social Security numbers, driver's license numbers and passport numbers. Information such as immigration status is also input into the client record database at step 907. Personal information such as a client's blood type and DNA characteristics are also stored in the client record database. Information related to administering a system such as a tracking agency (for instance, the Department of Defense, the Department of Homeland Security, or the Federal Bureau of Investigation) is included along with contact information for responsible case workers. Client data also includes contact information for certain peripheral devices such as the client pager ID and the agent pager ID.

Moving to step 909, a voice sample is recorded from the client and then stored in digital form in the client record database at step 909. At step 910, a voiceprint template is also stored. The voiceprint template includes a series of characters, such as numbers or alphanumeric characters and words which are assembled in a random phrase. At step 911, the client's current photograph is taken and stored in digital format. Physical samples such as blood and hair samples are taken for DNA testing purposes at step 913. A personal identification number (PIN) is selected and input at step 914. The information resulting from the testing is then stored in the client record database. At step 915, a schedule of callback times and callback requirements is input. The schedule can include an automated set of rules which can set an ordered or random callback schedule. In the preferred embodiment, callback requirements are scheduled manually. In an alternative embodiment, the host program may assign random or scheduled callback requirements. The frequency of callbacks may be linked by the host program to various parameters.

The information to be sent to and received by the client during a callback requirement is also input into the client record database at step 915.

At step 917, the client's risk level is evaluated and input into the client record database. The "risk level" is a numeric parameter estimating a client's likelihood to perpetrate an unwanted act. In the preferred embodiment, the "risk level" is stored as a score from 1 to 100 where the higher the score, the lower the risk. For example, a client with an extensive criminal history or from a specific geographic region or country may be categorized as "high risk". "High risk" clients are scheduled with a higher callback frequency. "Low risk" clients are scheduled with lower callback frequency. Frequent callbacks lower the allowed mobility of the client. Conversely, infrequent callbacks raise the allowed mobility of the client.

When the "risk level" is changed, other parameters such as the list of restricted geographic areas for the client may increase. Additional rules in the preferred embodiment provide for a tabulation of all high risk individuals in a specific geographic area or area code upon the failure of any callback requirement by a high risk client. Of course, other rules related to "risk level" will be obvious to those of skill in the art.

In step 919, the current prevailing "threat level" is input into the system. Geographic limitations for each individual client are input at step 921. Relationships between clients are input into the system at step 923. Conditional rules which control how various parameters in the database affect other parameters iteratively and recursively are input into the system at step 925. Additionally, alert parameters such as a sequence of events which would trigger an alert and the type of alert medium to be used in issuing the alert, are input into the system at step 927. At step 929, upon completing the enrollment process, the system is activated.

The host program and computer system are generally programmed to carry out the following sequence of events. Enrolling a client in the client record database is first completed for one or more clients including a schedule of where a callback request will be issued. Telephony device 604 (as shown in FIG. 1) generates a signal and transmits it to client pager 603 based on a schedule of events entered during an enrollment process, to be later described. The signal includes a callback requirement which requires client 600 to call a designated phone number and communicate specific information.

Client 600 initiates a call through phone 602. The telephony device receives the incoming call. The ANI system 606 determines the phone number of the client and transmits it to the computer system. A spoken voice sample is recorded. Voice comparator 608 compares the received spoken voice sample against a stored voiceprint and a voice template of random phrases. Computer system 614 compares the phone number of the received call with the stored client records 610 to verify the phone number of the client 600. An area code database or wireless phone equipped with a GPS identifies the location of the calling phone. All information obtained from client 600 by the computer system is compared against the relational client record database for various alert conditions (to be later described). If an alert condition exists, then alert device 704 sends an alert via agent pager 706 or e-mail 708.

Figure 5:
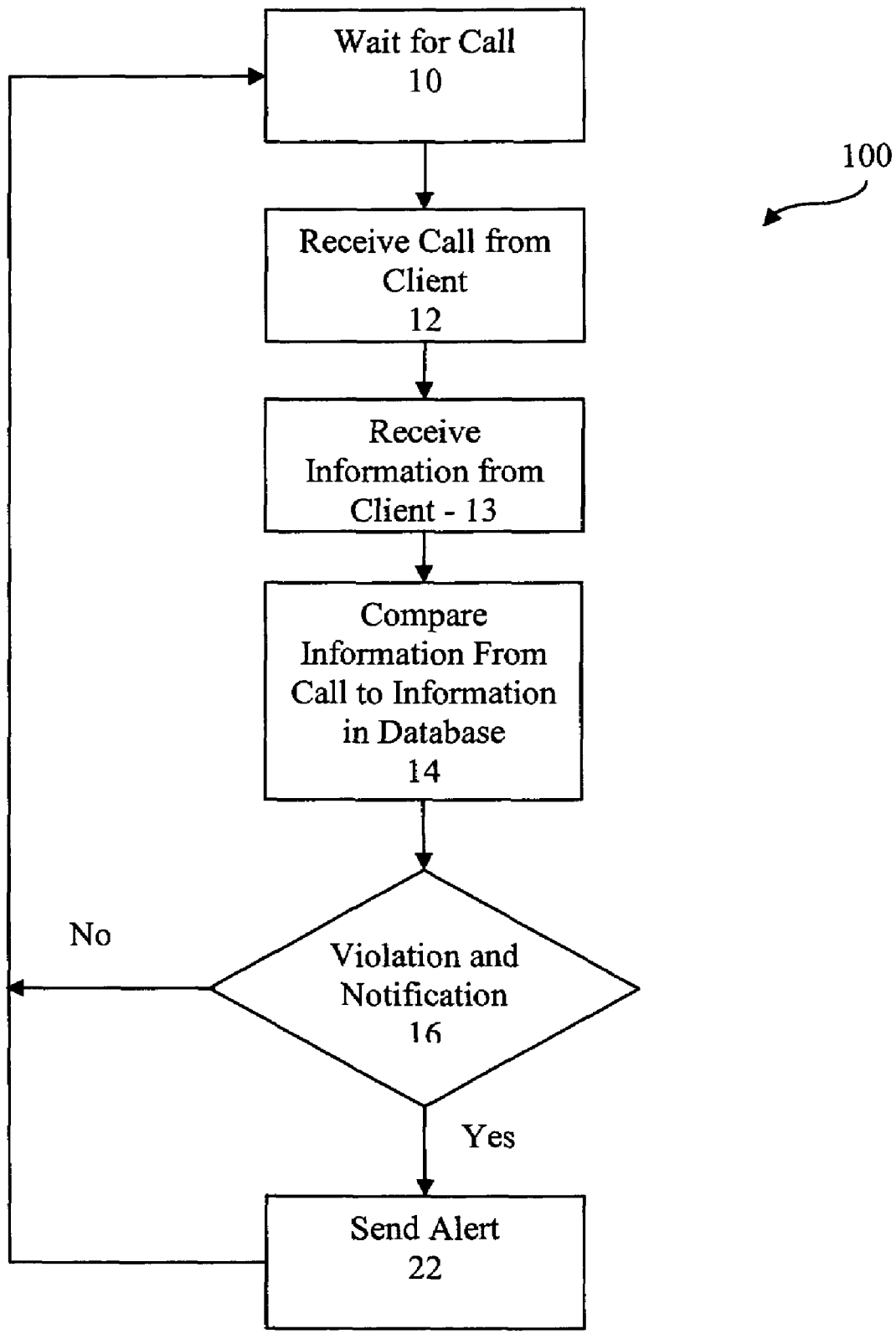
FIG. 5 illustrates an exemplary method of monitoring phones and conveying client information.

FIG. 5 is a flow chart illustrating a method to monitor phones and collect client information 100. The method of FIG. 5 includes the step of waiting for an incoming call 10. In the preferred embodiment, the host program waits for an interrupt request from telephony device 604. The host program then receives and acknowledges the incoming call and the corresponding interrupt request at step 12. The host program then receives data from the client by registering a voiceprint and/or data from a keypad of phone 602, at step 13. The host program then compares the information to a database containing information about the client at step 14. A decision is made at step 16. If a violation of any client conditions or locations is detected, an alert is sent at step 22. After an alert has been sent or if no violation has occurred, the host program returns to step 10, and waits for another call.

Figures 6A, 6B:
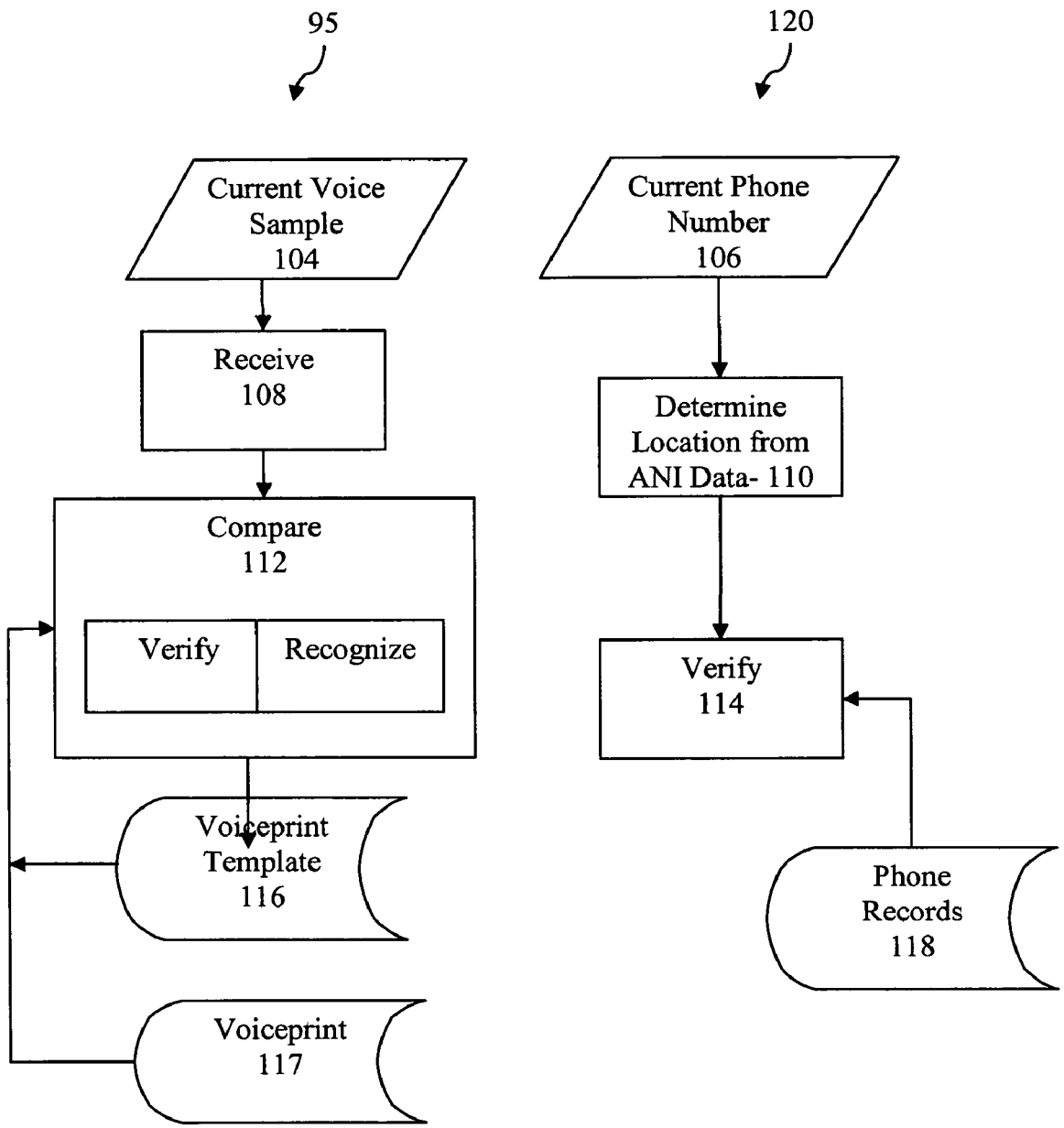
FIGS. 6a and 6b illustrate exemplary methods for verifying client identity.

Turning to FIG. 6a, illustrated is an exemplary method for verifying client identity 95. Method 95 includes receiving a spoken voice sample 104 from the client at step 108. Spoken voice sample 104 may be stored on the computer as data before being processed by the system. Spoken voice sample 104 is a phrase or series of words that the client is instructed to speak by the automated system.

Method 95 includes comparing a spoken voice sample 104 against a stored voiceprint 117 and voiceprint template 116 at step 112. The stored voiceprint template contains random phrases to be spoken by the client and recorded. The stored voiceprint contains a frequency evaluation of a voice sample of the client. Step 112 is typically carried out by speech-recognition software. The speech recognition software also recognizes the spoken voice sample as the correct or incorrect phrase that the client was instructed to speak and verifies it. A report of the conclusion is then sent to the host program.

In one exemplary embodiment of the method, a first spoken phrase may be stored for later comparison or immediately compared to a stored voiceprint. A second spoken phrase is then stored for later comparison or immediately compared to a stored voiceprint containing the second phrase. If either of the voice samples does not match the stored voiceprint, the client may be prompted for additional spoken phrases. Any number of spoken phrases may be stored. Comparison between the voice sample and the voiceprint is language independent. In the preferred embodiment, the speech recognition software used is PIN-LOCK™, sold by T-Netix Corporation of Dallas, Tex., USA. The PIN-LOCK™ software has an accuracy of about 99.4%.

Figure 9:
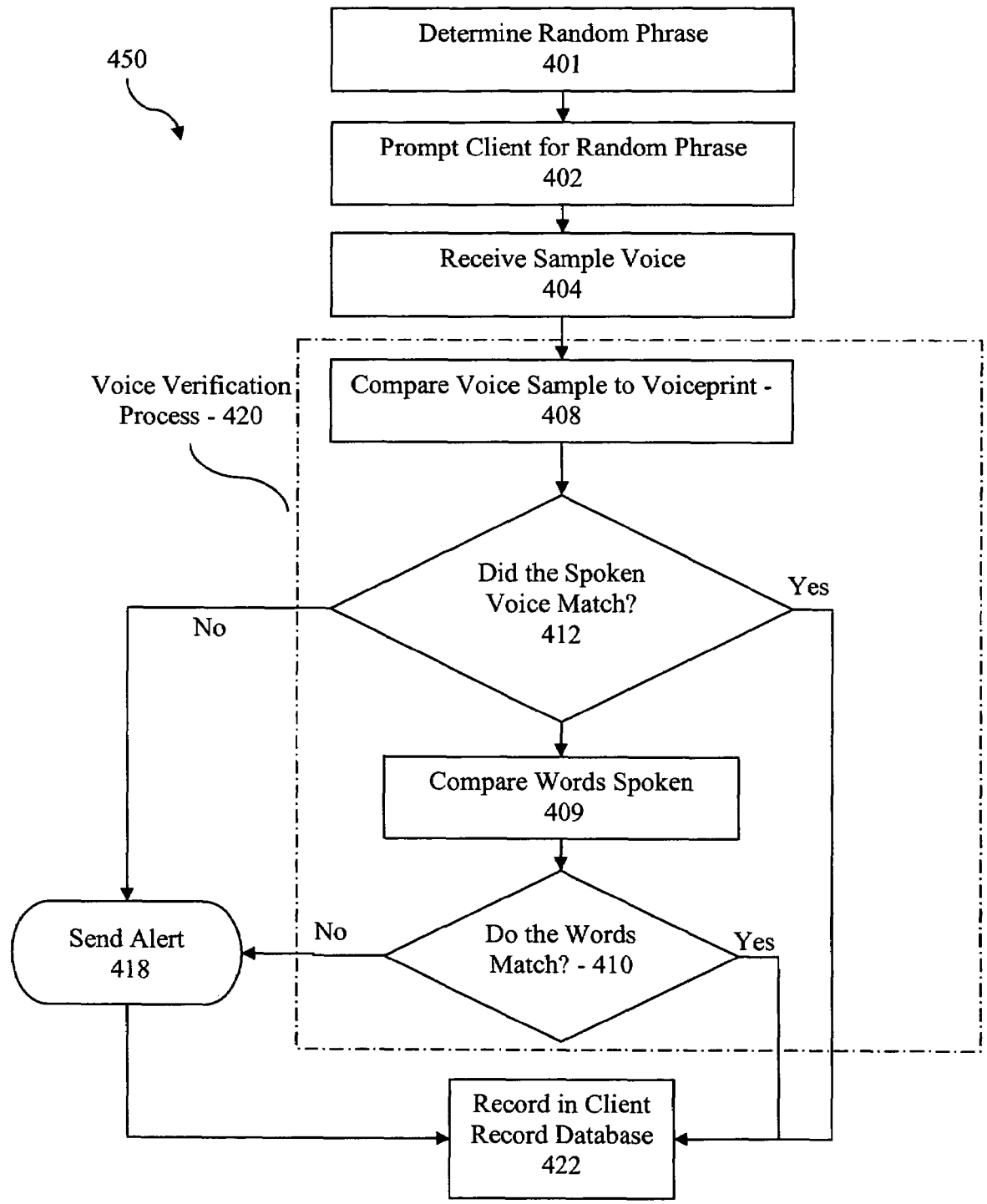
FIG. 9 illustrates an exemplary method for verification and location tracking of a client.

An alternate method of verifying a voiceprint is shown in FIG. 9. Turning to FIG. 9, illustrated is an exemplary method for verification of a voiceprint of a client 450. In the preferred embodiment, the rules implemented upon the failure of a callback requirement may include increased frequency of future scheduled callback requirements or the change from scheduled callback requirements to random callback requirements.

At step 401, the host program determines a random phrase from the voiceprint template stored during the enrollment process. Determining the random phrase includes the step of assembling words and/or characters from the voiceprint template, randomizing them and transmitting the random sequence to speech synthesizer 607. Upon receipt, speech synthesizer 607 generates a human sounding voice pattern representing the random phrase chosen at step 401 and transmits it to telephony device 604 for transmission to phone 602 and receipt by client 600.

In one example, prompting a client for the random phrase at step 402 may be carried out by a VoiceXML script as follows:

"<prompt>Repeat the following phrase (random phrase) <prompt>"

The method includes receiving a spoken voice sample from the client at step 404, and entering voice verification process 420. The voice verification process includes comparing the spoken voice sample against the stored voiceprint at step 408. The voice verification process includes a decision at step 412 of whether or not the spoken voice sample matches the frequencies of the voice print. If not, an alert is sent at step 418. The event is subsequently recorded in client record database at step 422. If the spoken voice sample matches the voiceprint, the event will also be recorded in client record database at step 422. At step 409, the words identified in the spoken voice sample are compared against the words in the random phrase generated by the host program and sent to the client during the callback requirement. If the words spoken by the client do not match the words required to be spoken, at step 410, an alert is sent at step 418. The event is then recorded in the client database at step 422. If the words spoken by the client match, the event is also recorded in the client record database at step 422.

The exemplary method of FIG. 6b shows a method of verifying the location of a client using a hardwired telephone 120. In this method, the client's phone number is received by the computer system through the ANI service and decoded to determine the area code of the number. The host program then uses the area code of the number to reference a lookup table which correlates area code data to geographic locations to determine the location of the client. Exemplary method 120 also includes verifying a phone number 106 of the client at step 114. Verifying the phone number is carried out by comparing the number reported by the ANI service to phone records 118 stored in the client record database to determine if the phone used is indeed that of the client.

Figure 7:
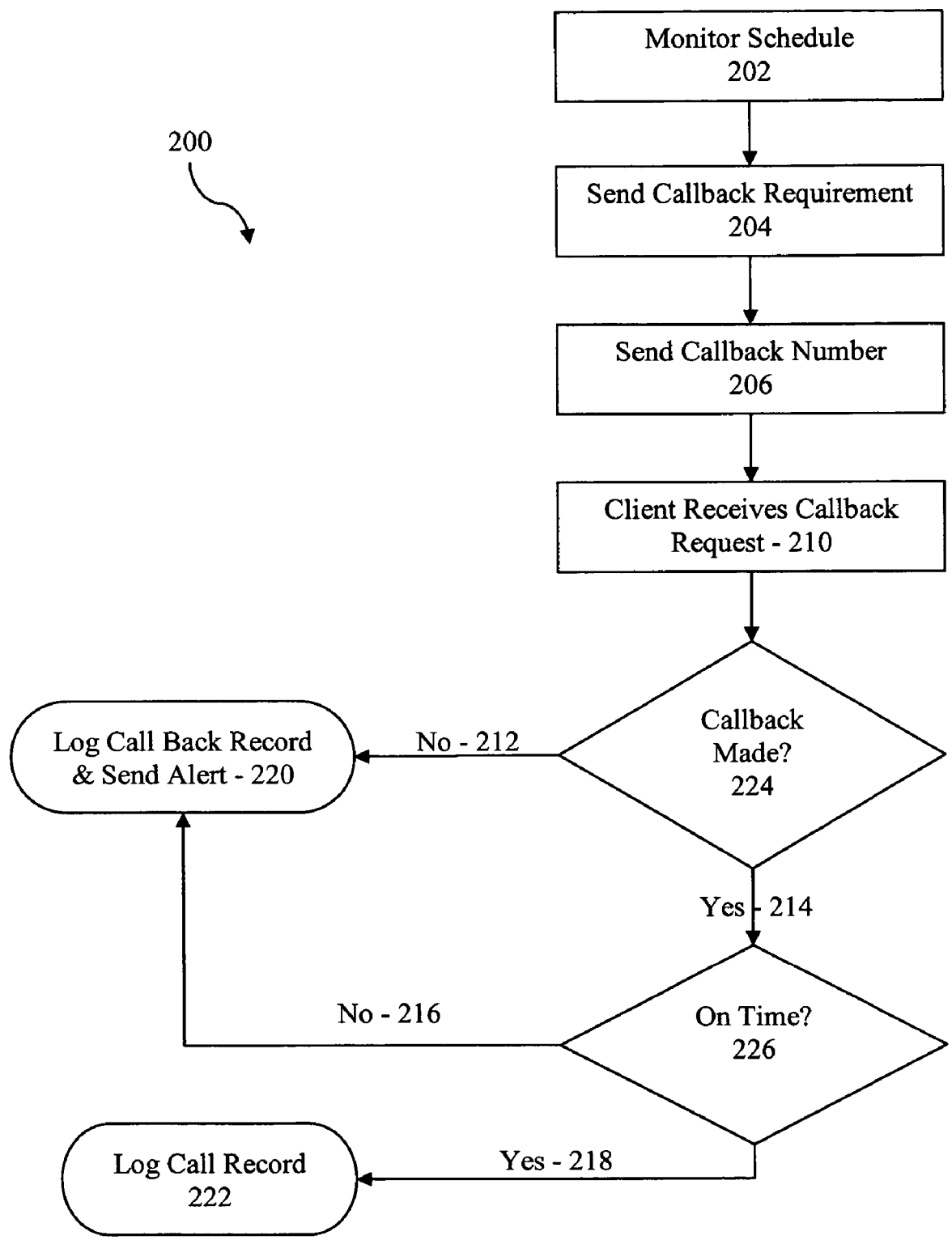
FIG. 7 illustrates an exemplary method for notifying a client of a callback requirement.

Referring now to FIG. 7, illustrated is an exemplary method for notifying the client of a callback requirement 200. The host program in this method monitors the callback schedule input during the enrollment process at step 202.

Method 200 also includes the step of sending a callback requirement 204 and a callback number 206 to the client. The callback requirement is a request made remotely to a client to contact the system. The callback number informs the client of a requirement to call a specified number. Of course, other information can be sent to the client with the callback requirement such as the callback time or other information to be provided during the callback. The callback requirement may also include the location that the client must respond from and the number of callbacks required. The callback requirement of the preferred embodiment is sent via client pager 603.

Method 200 includes logging the callback record and sending an alert. Once the client receives the callback requirement at step 210, the host program acknowledges a callback or lack of a callback at step 224 as decisions 214 and 212, respectively. The time that the callback is received is compared to the appropriate callback time stored in the client record database at step 226. If the callback was not received on time (decision 216), a record is created and an alert is generated at step 220. If the callback is received on time (decision 212), a record is created at step 222. The callback record is maintained in the client record database.

Figure 8:
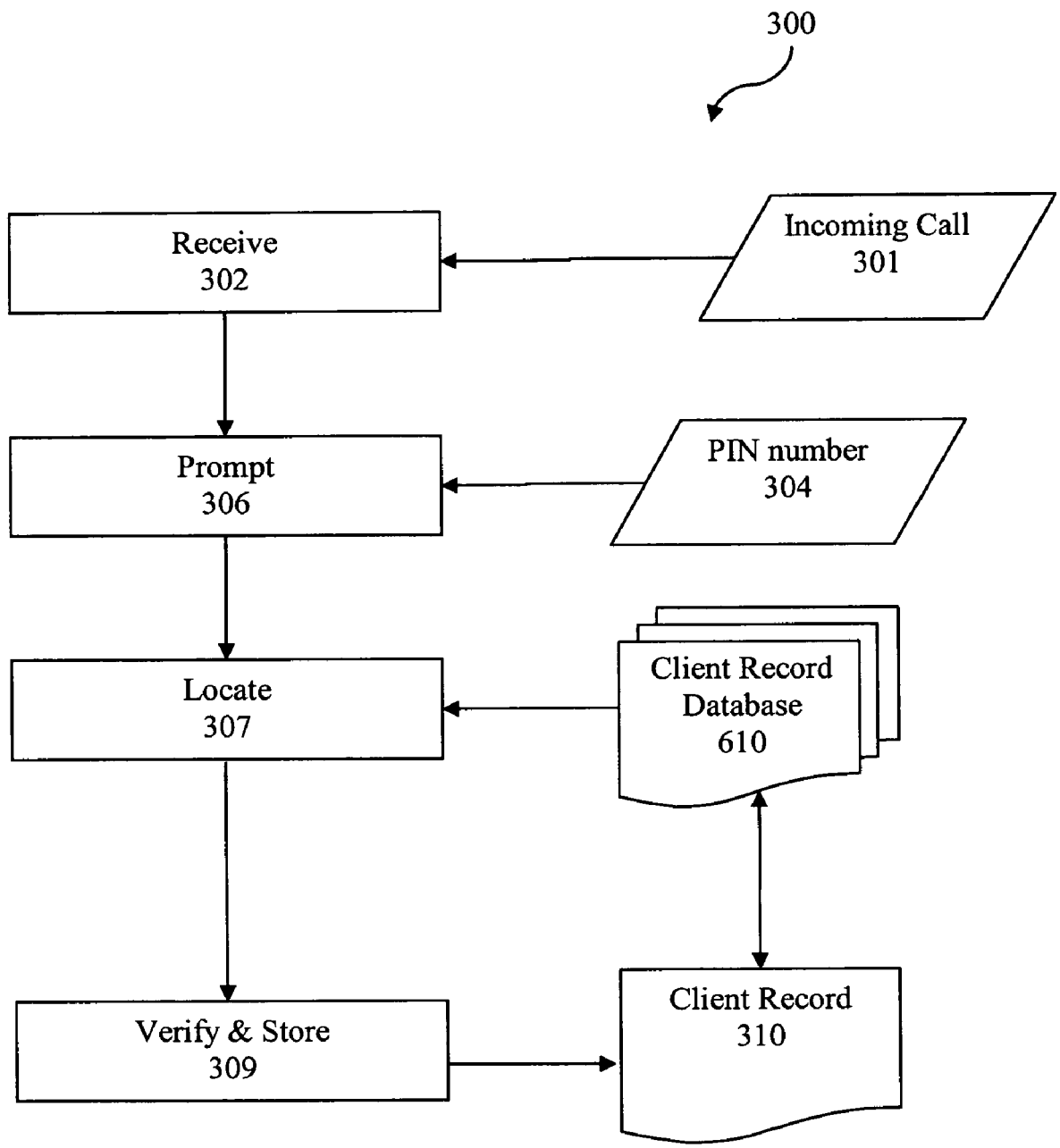
FIG. 8 illustrates an exemplary method for prompting a client for a PIN number and locating a client record.

Turning to FIG. 8, exemplary method 300 for prompting for and verifying a PIN 304. Method 300 includes receiving an incoming call 301 from a client at step 302 and prompting for PIN number 304 at step 306. Prompting the client for the PIN number is carried out by the host program.

In an exemplary embodiment, the host program uses the "TellMe" service to allow interaction between a computer system and an individual listener via a phone headset and keypad. The TellMe service retrieves a VoiceXML script from a web server and executes it.

The following is VoiceXML code used by the preferred embodiment:

```
<vxml version="1.0">
    <form id="login">
        <field name="pin">
            <grammar>
                <![CDATA[Four_digits]]>
            </grammar>
            <prompt>Please enter your 4 digit pin
            code.</prompt>
            <filled>
                <submit
                next="http://www.immigration.gov/pin.php"/>
            </filled>
            <noinput>Please Enter PIN.<reprompt/></noinput>
            <nomatch count="1">Invalid
            PIN.<reprompt/></nomatch>
            <nomatch count="2">Too many
            attempts.<exit/></nomatch>
        </field>
    </form>
</vxml>
```

The phrase "<form id='login'>" creates a form called "login" which is represented by a series of field items to be filled in by interaction with the client. "<field name='pin'>" creates an interactive dialog between the user and the system named "pin". The use of "<grammar>" defines the set of valid expressions that a client may say or type during the interaction. The client is limited to a valid expression of four digits. "<prompt>" queues recorded audio and synthesized text to speech in an interactive dialog. "<prompt>" plays the recorded or synthesized audio announcing "Please enter your 4 digit pin code." "<filled>" assigns a value to "pin" and submits the value to the dynamic webpage "http://www.immigration.gov/pin.php" to verify the validity of the PIN number. The code contains voice outputs if no PIN number is entered or the PIN number is invalid. The code informs the client that they have attempted to enter their PIN number too many times if the PIN number does not match the one in the record within 2 attempts. Of course, this is an example and other code which carries out the functions will suffice.

Method 300 also includes locating a client record 310 based upon the PIN number 304 at step 307. Locating a client record 310 based upon PIN number 304 is carried out by searching a client record database 610 for client record 310 associated with PIN number 304. At step 309, method 300 compares the PIN entered to that stored in 310. The result of the comparison is then stored in the client record.

Figure 10:
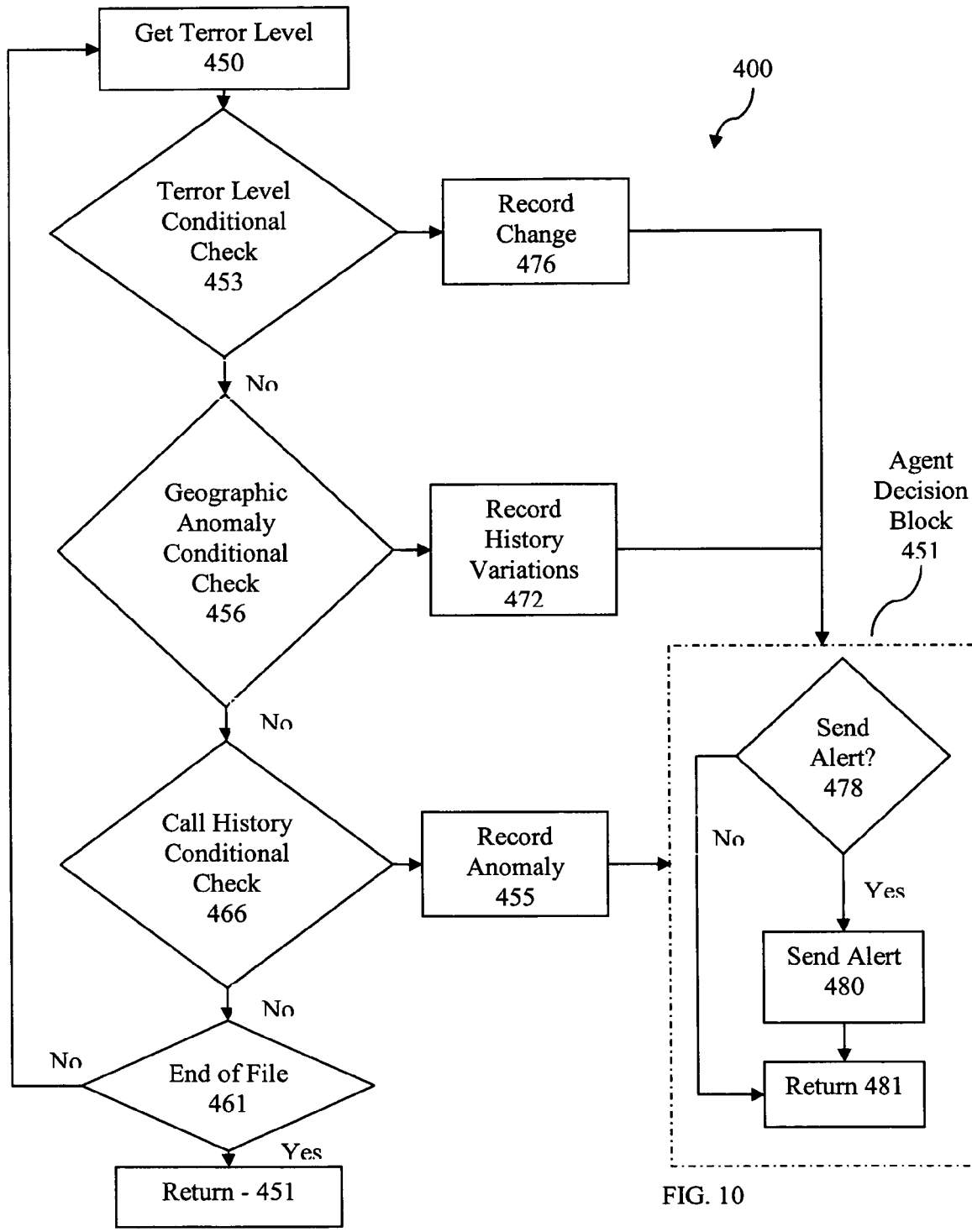
FIG. 10 illustrates an exemplary method for conditional analysis in the present invention.
Figure 11:
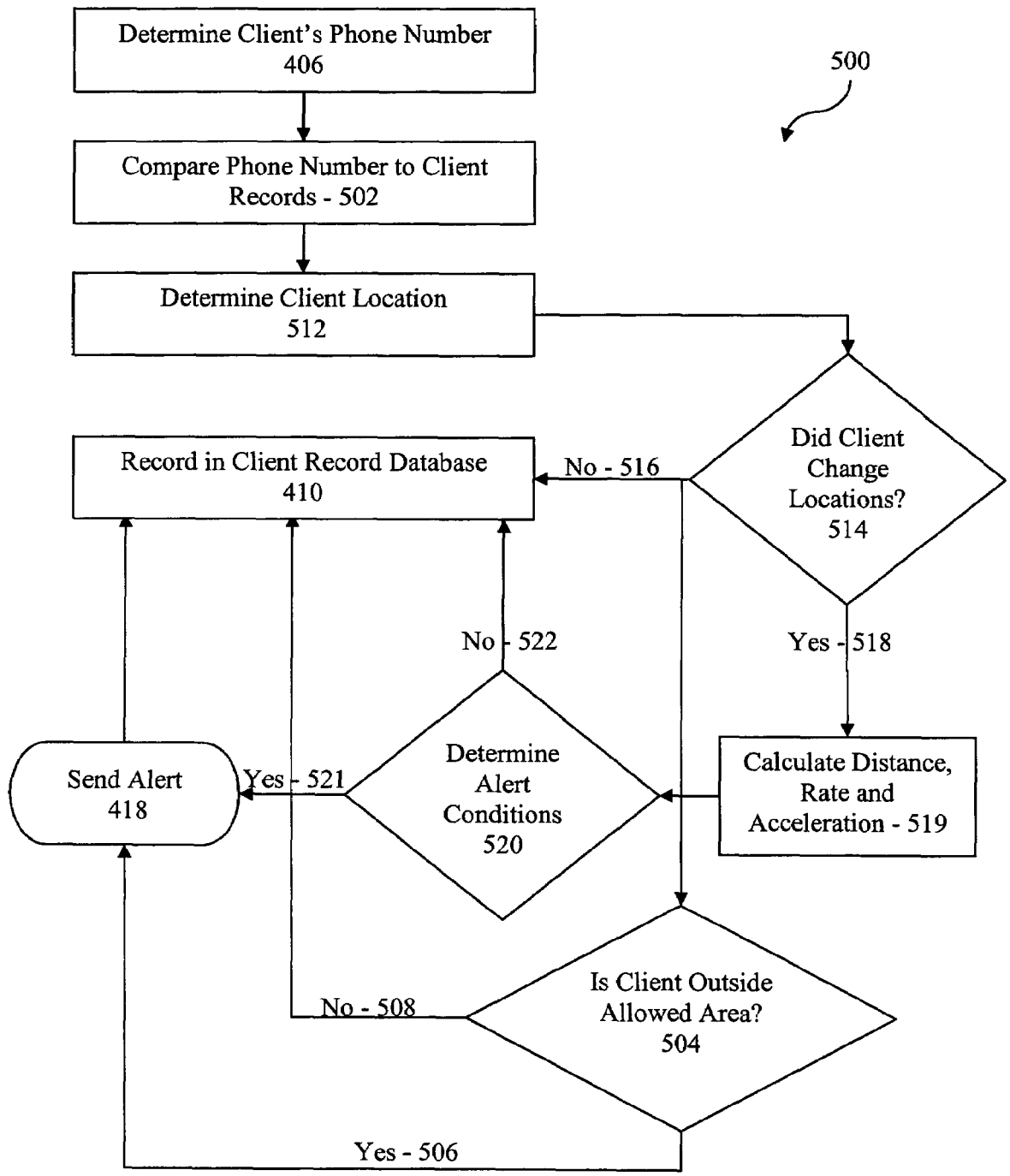
FIG. 11 illustrates an exemplary method for triggering an alert based upon a change in geographic location or a disallowed phone number.

Turning to FIG. 10, a method for issuing conditional checks and issuing an alert is depicted as 400. Conditional checks are a series of rules applied continuously to the fields stored in the client record database, then carried out by the host program. They are designed to examine client records and trigger alerts based on preset or adaptable conditions. The method in FIG. 10 is a recursive application applied to one, a group, or all of the client records in the client record database repeatedly during operation of the system.

One conditional check parameter is known as "terror level". The "terror level" parameter is a generalized value which quantizes the generally perceived risk of a terror attack. The terror level may be set manually. Additionally, terror levels may be set automatically by computer networks linked to government terror monitoring agencies or internet alert websites. For example, the "terror level" may correspond with the United States Homeland Security Advisory System threat levels and may also correspond with a local or regional threat level system. In the preferred embodiment, the terror level is a numeric value between 1 and 4. Method 400 includes the step of retrieving terror level 450.

At step 453, the host program changes any subset of data parameters in the client record database to reflect the terror level. For example, a rule might be instituted at the time of enrollment whereby the frequency of required callbacks can increase and/or callback times and/or numbers can change dependent on the terror level. The rule may also specify groups of specific clients can be contacted, clients in geographic areas can be contacted. Clients demonstrating a certain connection or relationship can be contacted; for example, a family or geographic relationship can be used to contact clients.

The host program executes step 453 by iteratively searching each client record in the client record database and comparing each record to a list of predetermined rules which instruct the host program how to change each record according to a change in the "terror level". For example, the numeric value of any field in the client record database may be changed. Additionally, the number of items in a list can be increased or decreased. Moreover, the host program may alter parameters which affect other actions of the system. For instance, the "risk level" parameter can be referenced and changed in response to a change in the "terror level". A change in the "risk level" will in turn affect other parameters such as callback frequency.

The conditional checks can be interdependent. For example, the "terror level" can have an effect on a "geographic anomaly". As the terror level is increased, increased locations are designated as areas of interest. As an example, suppose airports and military installations are designated as areas of interest. When the terror level increases, the number of high risk areas increases according to a predetermined schedule or list. If a client record in the database identifies that a client is in one of the additional areas of interest implemented by the increase in terror level, then an alert is issued. In another alternative, an increase in terror level may trigger a record containing prohibited cities or states for certain clients.

As another example, an increase in threat level from orange (3) to red (4) can be set to increase the frequency of callback requests from once a week to once a day and also decrease the number of high risk individuals permitted in the same geographic location.

In another example, an increase in threat level from orange (3) to red (4) can increase the "risk level" parameter for a specific client. In response to the increase in "risk level", a list of restricted geographic areas for that specific client will be increased to include additional areas and locations.

At step 476 the change in threat level is recorded and the host program proceeds to alert decision block 451.

Alert decision block 451 includes steps 478, 480 and 481. Alert decision block 451 is customized to apply rules from any conditional check performed by the host program. In the preferred embodiment, alert decision block 451 includes decisions related to the terror level conditional check, the call history conditional check and the geographic anomaly conditional check. If the rules applied indicate that an alert is to be sent, an alert signal is sent at step 480 and control is returned at step 481. If not, control is returned to the host program at step 481.

During a terror level conditional check, alert decision block 451 generates alerts based on rules related to the terror level setting. For example, in response to a missed callback requirement a single missed callback "low risk" from a client may not give rise to an alert during a low "threat level". However, a single missed appointment during a state of heightened "threat level" for the same client may trigger sending an alert 480.

After completing the evaluation of the terror level conditional check, the host program proceeds to the "geographic anomalies" conditional check, at step 456.

The "geographic anomalies" conditional check, at step 456, determines the need to send an alert based on the geographic relationship between clients and locations and/or between clients. For example, a geographic anomaly might include the number of "high risk" clients are in a specific area code, city, county, state or region. Depending on the specific location, the number of high risk clients tolerable before an alert is sent may vary. Also, the number of high risk clients allowed in a specific area code, city, county, state or region may be decreased or increased based on a decrease or increase in "threat level".

Other geographic anomalies include the total number of changes in a client's location, the rate of change in the client's location, acceleration of change in the client's location or the distance involved in the change of a client's location. Other geographic anomalies include the location of a client at a high risk area such as an airport, dam, bridge, nuclear facility and a military installation. A change in the client altitude may also trigger a geographic anomaly.

If a geographic anomaly is identified, the anomaly is recorded at step 472 and the host program proceeds to the alert decision block 451.

During a geographic anomaly conditional check, alert decision block 451 generates alerts based on rules related to the geographic anomalies located. For example, if the rate of change in a client's location, that is, if the frequency of the client's movement increases, an alert condition could be triggered based on the rate exceeding a simple numeric value. Similarly, if the rate of the client's movement is accelerating, an alert could be sent at step 480.

If no geographic anomaly is identified, the host program proceeds to step 466.

A conditional check known as "call history" is performed at step 466. In the "call history" conditional check, client information is analyzed to determine if the client has missed a callback requirement. If the client is determined to have missed a callback requirement, the failure is recorded and the rules input during enrollment as to the history conditional check are implemented. The failure is recorded in the client record database at step 455 and the program proceeds to alert decision block 451.

During a call history conditional check, alert decision block 451 generates alerts based on rules related to the call history of the client. For example, a preprogrammed rule retrieves the frequency of required callbacks, the number of missed calls, the threat level and the risk factor stored in the client record and adds the numeric values. The sum is then compared to a threshold set of parameters to make a decision. In the preferred embodiment, the following algorithm is used:

If total>100, then issue alert

If total<100, do not issue alert

Of course, the rule which determines the decision to send an alert can be modified to reflect a weighting of parameters.

Alternative rules may be used. For example step 478 may require an alert due to the number of missed calls within a certain time span. In this alternative, the total number of missed calls for all clients in the database (or any predefined subset of clients) is monitored over time. If the rate of missed calls surpasses a threshold, an alert is issued. For example, if there were missed calls from five high risk clients in one hour, an alert might be issued. In another alternative, a predefined subset of clients is chosen from the client record database available; for instance, all high risk clients or all clients within a specific geographic region. A specific subset of clients may be chosen to reflect specific clients; for instance, clients within a terror cell organization or clients with a family relationship. For example, if there were four missed calls from five high risk clients who were known to be in the same state, an alert might be issued. After completing the call history conditional check at step 466, the host program proceeds to an end of file check 461 to determine if all the records and databases have been searched. If so, control returns to the host program at step 451. If not, the host program returns to step 450.

Another example is if a high risk client enters a single high risk area generating a geographic anomaly, then an alert would be sent at step 480.

Turning to FIG. 1, illustrated is an exemplary method for triggering an alert based upon a change in a client's geographic location or based upon an impermissible calling location or the rate of change in location, 500. The method includes first determining a client's phone number at step 406 and comparing the phone number to the client's records at step 502. After comparing the phone number to the client's records the client's location is determined at step 512.

Once the client's location has been determined, the method includes determining whether or not the client changed locations 514. If the client's present location differs from the client's previous location (condition 518), the program proceeds to step 519 where the distance of the change is calculated by calculating the distance between the last known location of the client and the current location of the client. Also at step 519, the program calculates the rate of change by differentiating with respect to the time between callbacks. At step 519, the program also calculates the acceleration of the change in location by differentiating the relative rates of change between previous locations. The program then proceeds to step 520 where it determines if the change in location, the distance in the change, the rate of change and/or the acceleration comprises an alert condition. If so, the program moves to step 418, where an alert is sent. If not, (condition 522) the condition is recorded in the client record database at step 410, then an alert is sent at step 418 and the location change is recorded in the client record database at step 410. If no change in the client's present location occurs (condition 516), a record is made in the client record database at step 410. The client record is also updated to reflect the most recent time that the client was at the location. The method then proceeds to step 504.

At step 504, a determination is made as to if the client's location is outside a permissible calling area. An alert will be issued at step 418 if the client is outside the allowed calling area (condition 506) and the event is recorded at step 410. If not (condition 508) then the event is also recorded at step 410.

The present invention also provides for a means of tracking a client with a global positioning system (GPS) enabled cell phone.

Figure 12:
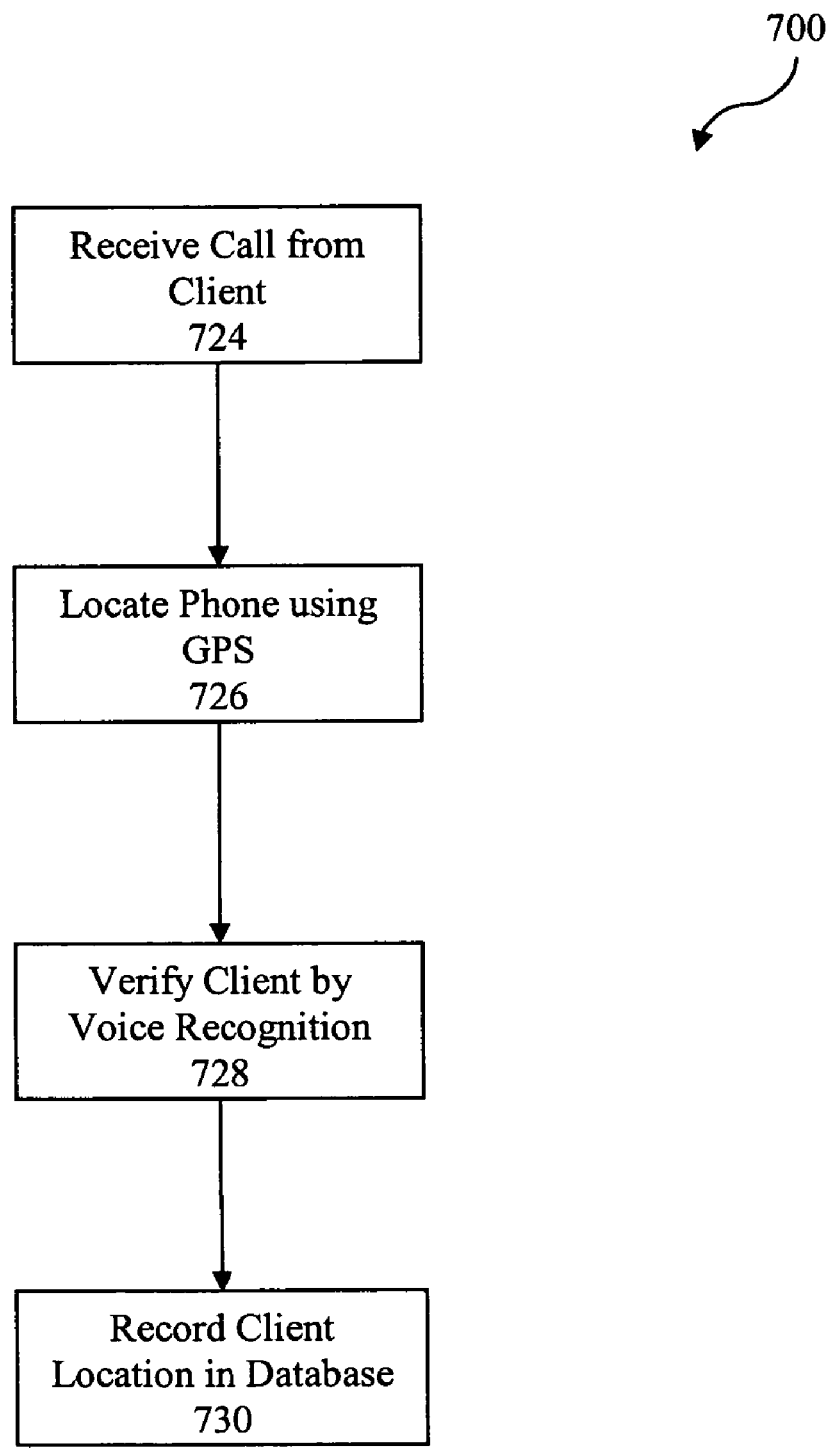
FIG. 12 illustrates an exemplary method including GPS phone tracking.

Turning now to FIG. 12, a method is shown for locating a client in possession of a GPS cell phone 700. The GPS is made up of a network of satellites that allows triangulation and calculation a client's exact location. A-GPS or "assisted" GPS, provides a caller's location by triangulation between cell phone towers.

At step 724, a call is received from the client. When the call is received, the location of the client's phone is identified at step 726 using GPS and/or assisted GPS. The client's voice is then verified by voice recognition at step 728. Voice recognition techniques disclosed earlier can be used to accomplish this.

The client's location as determined from the GPS tracking is then recorded into client record database at step 730. A client's location may be tracked continuously and plotted on a map indicating the client's travels. If the client's phone is located but no voice verification has been made at that location, then the map plot may be identified with a distinct color indicating that the location has not been verified.

Figure 13:
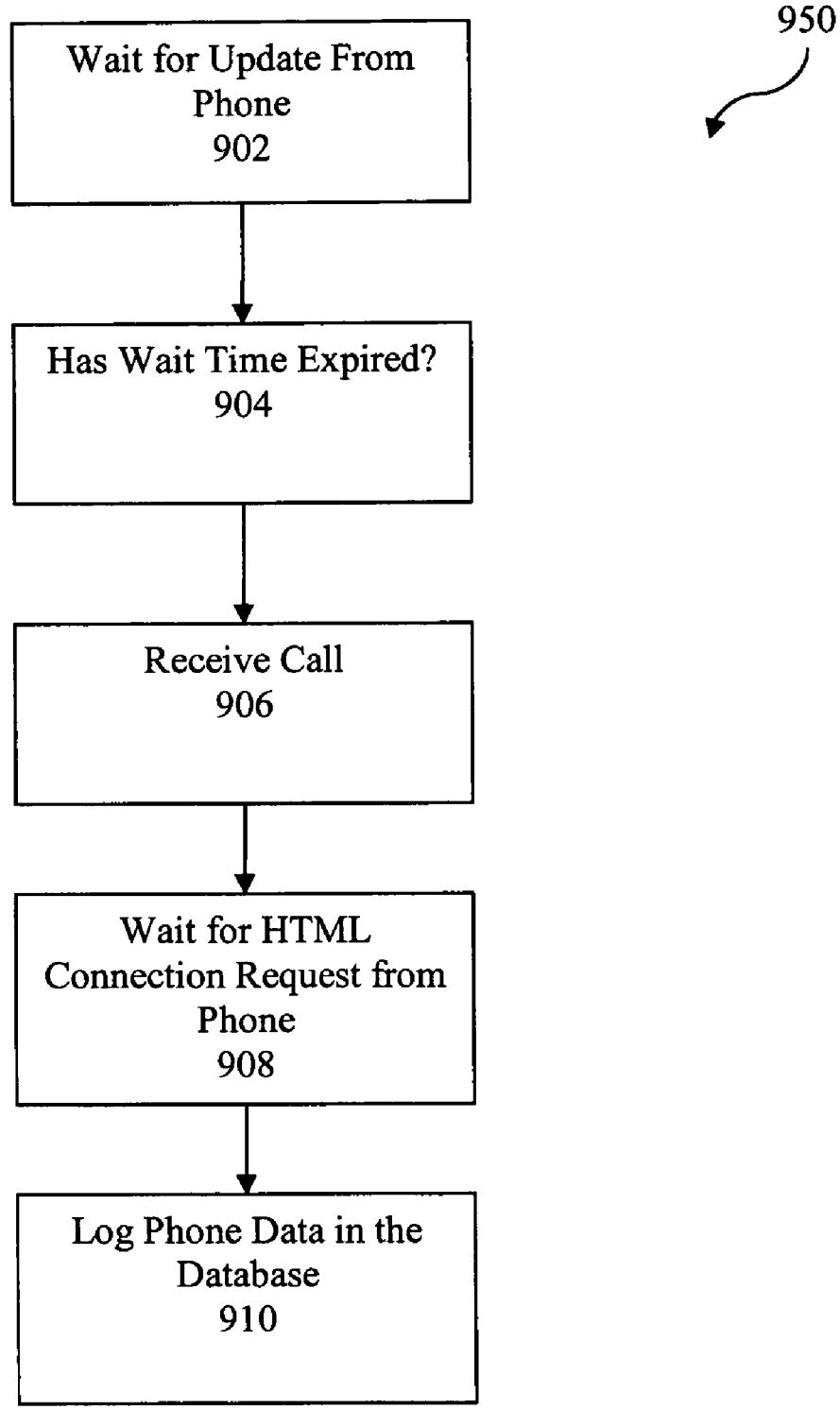
FIG. 13 illustrates an exemplary method of HTML communication with a cell phone.

Turning now to FIG. 13, depicted are the steps for receiving a GPS phone call from a computer system interconnected to a GPS system, 950. The host program waits for an update from the phone at step 902. The host program checks to see whether the allotted wait time has expired at step 904. When a call is received at step 906, the host program waits for an HTML connection request from the phone 908. The GPS phone assigned to the caller is able to connect to the server using an HTML connection requests to upload the GPS data to the server. The server then logs the client's phone data in the client record database at step 910.

A GPS software application runs continuously on the GPS phone and acquires and stores its position regardless of whether a call is made by the client. The GPS software application can set the GPS phone to determine its location at a specified time or series of time intervals and sent to the server. The GPS data sent from the GPS phone to the server includes the phone's location as the call is made and which is recorded by the GPS phone at each interval. This accumulation of GPS data allows the server to accurately determine the movement of the GPS phone and the client. In the preferred embodiment, the GPS application is developed in J2ME.

Figure 14:
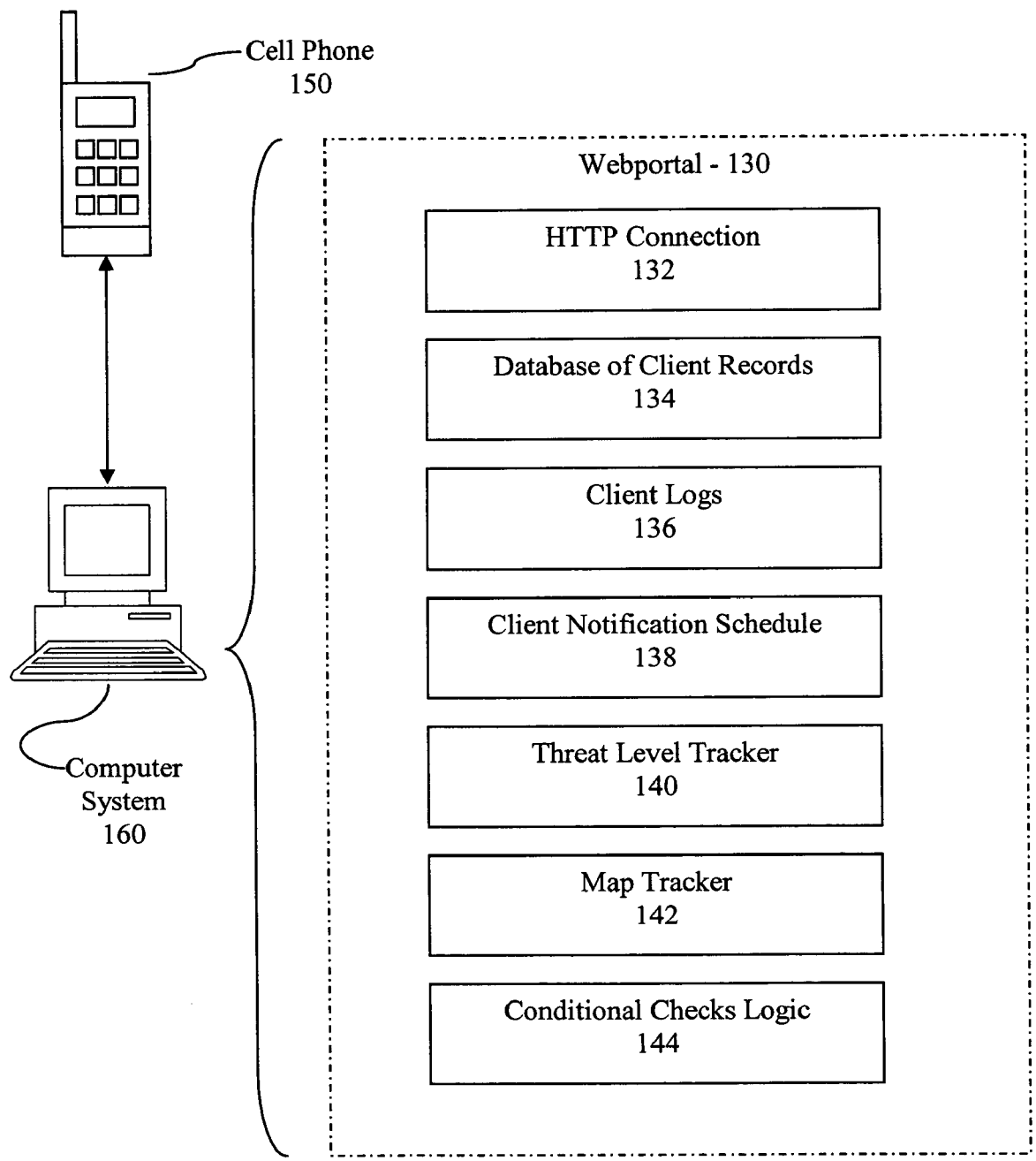
FIG. 14 illustrates an exemplary computer system for carrying out the invention with a GPS cell phone.

Turning now to FIG. 14, the components and features of the "Webportal™" software 130 used by the present invention are shown. The Webportal™ software is developed in VB.net and ASP.net in the preferred embodiment. Webportal™ software 130 contains a database of client records 134, protocol for making an HTTP connection 132, client logs 136, a client notification schedule 138, threat level tracker 140, map tracker 142, and modules for conditional checks 144.

In FIG. 14, cell phone 150 is connected to computer system 160. Once connected with the computer 160, Webportal software 130 is capable of making an HTTP connection with the cell phone.

If a client calls from a GPS enabled-phone, Webportal software 130 compares data received from the phone to database of client records 134, logs the call in the client logs 136, and also tracks the client's movement on a map tracker 142 based on the received GPS interval data.

The Webportal software also has a client notification schedule 138 which designate set call-in times for clients and scheduled pages. Webportal's threat level tracker 140 monitors United States Homeland Security Advisory System threat levels and allows for customization of threat levels for individual clients. The logic for conditional checks 144 checks groups of clients and individuals and identify any recognized anomalies. The conditional checks are directly tied to operable alarms to notify case workers when an anomaly is identified.

This invention is susceptible to considerable variation in its practice. Accordingly, this invention is not limited to the specific exemplifications set forth herein above. Rather, this invention is within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part of the invention under the doctrine of equivalents.

The invention claimed is:

1. A system for monitoring the location of an individual comprising:
    a computer system including a memory and a database;
    a first peripheral alert device operationally connected to the computer system;
    a second peripheral alert device operationally connected to the computer system;
    a peripheral speech synthesizer operationally connected to the computer system;
    a telephone location means, for identifying the location of a telephone, operationally connected to the computer system;
    a software system, resident in the memory, for coordinating the functions of the computer system comprising:
        an enrollment module for accepting data related to the individual and a callback schedule;
        a callback requests module for monitoring the callback schedule and sending a callback request to the first peripheral alert device;
        a database control module for monitoring the database;
        a callback confirmation module for confirming a callback;
        a location verification module for verifying the location of the individual;
        a speech recognition module for verifying the voice of the individual; and
        an alert module for sending alerts to the second alert module upon occurrence of an alert condition.

2. The system of claim 1 wherein the first alert device is a pager.

3. The system of claim 1 wherein the first alert device is a telephone.

4. The system of claim 1 wherein the first alert device is an e-mail transmission.

5. The system of claim 1 wherein the second alert device is a pager.

6. The system of claim 1 wherein the second alert device is a telephone.

7. The system of claim 1 wherein the second alert device is an e-mail transmission.

8. The system of claim 1 wherein the telephone location means comprises:
    a phone number identification means, for providing a phone number and an area code of the telephone; and
    a look up table in the memory containing the area code and an associated area code location.

9. The system of claim 1 wherein the telephone location means comprises:
    a GPS enabled portable telephone; and
    a GPS interpretation module, in the memory, for interpreting GPS data from the portable telephone.

10. The system of claim 1 further comprising an altitude verification means operationally connected to the computer system for identifying the altitude of the individual.

11. The system of claim 1 wherein the data related to the individual comprises physical identifying data.

12. The system of claim 1 wherein the data related to the individual comprises risk level data.

13. The system of claim 1 wherein the data related to the individual comprises threat level data.

14. The system of claim 1 wherein the data related to the individual comprises geographic location data.

15. The system of claim 1 wherein the data related to the individual comprises alert conditions.

16. The system of claim 1 wherein the data related to the individual comprises a personal identification number.

17. The system of claim 1 wherein the data related to the individual comprises data related to the first peripheral alert device.

18. The system of claim 1 wherein the data related to the individual comprises data related to the second peripheral alert device.

19. The system of claim 1 wherein the callback schedule is randomized by the callback requests module.

20. The system of claim 1 wherein the callback schedule is manually set.

21. The system of claim 1 wherein the callback schedule is organized by the callback requests module.

22. The system of claim 1 wherein the callback request includes a return call phone number.

23. The system of claim 1 wherein the callback request includes a list of words to be spoken by the individual.

24. The system of claim 1 wherein the callback request includes information to be entered by the individual.

25. The system of claim 1 wherein the callback request includes a return call time.

26. The system of claim 1 wherein the callback request includes a return call frequency.

27. The system of claim 1 wherein the database control module includes conditional relationships.

28. The system of claim 1 wherein the database control module coordinates movement of data on a network.

29. The system of claim 1 wherein the database control module coordinates movement of data over an internet.

30. The system of claim 1 wherein the callback requests module monitors a telephone call from the individual.

31. The system of claim 30 wherein an arrival time of the telephone call is monitored.

32. The system of claim 1 wherein the speech recognition module identifies a frequency pattern of the voice of the individual.

33. The system of claim 1 wherein speech recognition module identifies a series of words in the voice of the individual.

34. The system of claim 1 wherein the alert condition includes failure of confirmation of a callback.

35. The system of claim 1 wherein the alert condition includes failure of confirmation of a voice verification.

36. The system of claim 1 wherein the alert condition includes failure of confirmation of a location.

37. The system of claim 1 wherein the alert condition includes failure of confirmation of the information.

38. The system of claim 1 wherein the alert condition includes an unacceptable rate of change of location of the individual.

39. The system of claim 1 wherein the alert condition includes an unacceptable acceleration of change of location of the individual.

40. The system of claim 1 wherein the database control module updates data in the database as a result of a change in a conditional parameter.

41. The system of claim 1 wherein the conditional parameter is a risk level parameter.

42. The system of claim 40 wherein the conditional parameter is a terror level parameter.

43. The system of claim 40 wherein the conditional parameter is a geographic anomaly parameter.

44. The system of claim 40 wherein the conditional parameter is a call history parameter.

45. The system of claim 40 wherein the conditional parameter is a location of the individual.

46. A method for monitoring an individual comprising:
  recording identifying data about the individual in a computer database;
  scheduling times for contacting the individual;
  contacting the individual and communicating a request for information and a request for a callback according to the schedule;
  monitoring a callback channel for a callback;
  verifying the callback;
  monitoring the callback channel for the information;
  verifying the information;
  sending a first alert upon a failure of verifying the callback;
  sending a second alert upon a failure of verifying the information; and
  modifying the identifying data upon a change in a control parameter in the computer database.

47. The method of claim 46 wherein the identifying data includes personal identification information.

48. The method of claim 46 wherein the identifying data includes geographic location data.

49. The method of claim 46 wherein the identifying data includes risk level data.

50. The method of claim 46 wherein the identifying data includes family relationship information.

51. The method of claim 46 wherein the identifying data includes social security numbers.

52. The method of claim 46 wherein the control parameter includes a threat level control parameter.

53. The method of claim 46 wherein the control parameter includes a geographic anomaly control parameter.

54. The method of claim 46 wherein the control parameter includes a history comparison control parameter.

55. The method of claim 46 wherein the step of contacting includes sending a page to the individual.

56. The method of claim 46 wherein the information includes a voice template.

57. The method of claim 46 wherein the information includes a location of the individual.

58. The method of claim 46 wherein the step of monitoring the callback channel for information includes monitoring a telephone line.

59. The method of claim 46 wherein the step of monitoring the callback channel for information includes monitoring ANI data.

60. The method of claim 46 wherein the step of monitoring the callback channel for information includes monitoring GPS data.

61. The method of claim 46 wherein the database is distributed.

62. The method of claim 46 including the further step of:
  recording the failure of verifying the callback in the computer database.

63. The method of claim 46 including the further step of:
  recording the failure of verifying the information in the computer database.

* * * * *